(12) United States Patent
Fondacaro

(10) Patent No.: US 6,196,150 B1
(45) Date of Patent: Mar. 6, 2001

(54) FENDER FOR PROTECTING BOAT HULLS AGAINST WEAR

(76) Inventor: Guy Fondacaro, 9, Rue Antoine Gautier, F-06300 Nice (FR)

(*) Notice: Subject to any disclaimer, the term of this patent is extended or adjusted under 35 U.S.C. 154(b) by 0 days.

(21) Appl. No.: 09/530,360

(22) PCT Filed: Oct. 31, 1997

(86) PCT No.: PCT/FR97/01951

§ 371 Date: Apr. 28, 2000

§ 102(e) Date: Apr. 28, 2000

(87) PCT Pub. No.: WO99/22987

PCT Pub. Date: May 14, 1999

(51) Int. Cl.[7] .................................................. B63B 59/02
(52) U.S. Cl. ........................................... 114/219; 114/220
(58) Field of Search ........................... 405/213; 114/219, 114/220

(56) References Cited

U.S. PATENT DOCUMENTS

| | | | |
|---|---|---|---|
| 2,952,979 | * 9/1960 | Rolando | 114/220 |
| 3,402,558 | 9/1968 | Hellinger | 61/48 |
| 3,464,213 | 9/1969 | Stephenson | 61/46 |
| 5,016,554 | * 5/1991 | Harris, Jr. et al. | 114/219 |

FOREIGN PATENT DOCUMENTS

| | | |
|---|---|---|
| 1119578 | 6/1956 | (FR) . |
| 1547866 | 11/1968 | (FR) . |
| 892541 | 3/1962 | (GB) . |
| 2019527 | 10/1979 | (GB) . |

* cited by examiner

*Primary Examiner*—Stephen Avila
(74) *Attorney, Agent, or Firm*—James C. Lydon

(57) ABSTRACT

The invention concerns a fender for absorbing shocks and preventing wear of a first object in relative movement with respect to a second object, comprising a main protective element with axial symmetry and circular cross-section rotating freely about a geometrical axis fixed relative to a support secured to one or the other of the first and second objects and having a hardness index less than that of said first object, and two secondary protective cone-shaped elements with axial symmetry and circular cross-section arranged at each end of the main protective element, independent thereof, and also freely rotating about the same geometrical axis.

12 Claims, 2 Drawing Sheets

FENDER FOR PROTECTING BOAT HULLS AGAINST WEAR

TECHNICAL FIELD

The present invention relates generally to devices aimed at absorbing shocks from an object moving against a fixed object such as a boat at anchor in a port, and relates more particularly to a fender device aimed at preventing wear on boat hulls due to shock and friction against quaysides.

BACKGROUND ART

It is well-known to use fenders which are elastomeric bodies hanging from ropes along the hull of a boat and which are inserted between the boat and the quayside when the boat comes alongside, thus protecting the hull against shock and wear. Unfortunately, as the fenders are hung vertically, there is very little protection against roll, which causes the boat to move along the vertical axis. In addition, when the boat comes alongside an articulated pontoon, fenders have the unfortunate disadvantage of bouncing off the pontoon when a person jumps onto the latter.

Fenders also exist, which are attached to pontoons or to quays. But because the latter are fixed, they do not protect the hull against wear when the boat is subjected to rolling.

The best system consists therefore of installing moving rollers around a fixed axis, either on the boat, or to the pontoon. A device of this kind is described in U.S. Pat. No. 3,145,685. It includes an axis on which a plurality of rubber rollers are mounted for absorbing the energy of shocks when the boat is subjected to vertical movements. Unfortunately, boat movements produced by turbulence in the water are not only vertical, and a boat is almost always subjected to horizontal movements which result in the boat rotating in one direction or another. In this case, unless rollers are fitted all along the boat or all along the pontoon, which would be exorbitant in cost terms, the boat is no longer protected by a roller at either end and its hull then strikes along the protruding axis, typically made of metal, at either end of the rollers, as in the patent referred to above.

SUMMARY OF THE INVENTION

This is why the main object of the invention is to provide an improved fender device for absorbing shocks and thus avoiding the wear to a moving object in contact with a fixed object regardless of the movements the moving object is subjected to.

The invention relates therefore to a fender device for absorbing shocks and thus preventing wear of a first object in relative movement with respect to a second object, in particular when the first object is a boat hull in contact with a pontoon, comprising a main protective element with axial symmetry and a circular section, freely rotating around a support integral with one or other of the objects, and having a hardness which is less than that of the first object, and two cone-shaped secondary protective elements, with axial symmetry and circular section, arranged at either end of the fender element and freely rotating around the same geometric axis.

BRIEF DESCRIPTION OF THE DRAWINGS

The objects and features of the invention will become more apparent from the following description when taken in conjunction with the accompanying drawings in which.

DETAILED DESCRIPTION OF THE INVENTION

Figure 1:
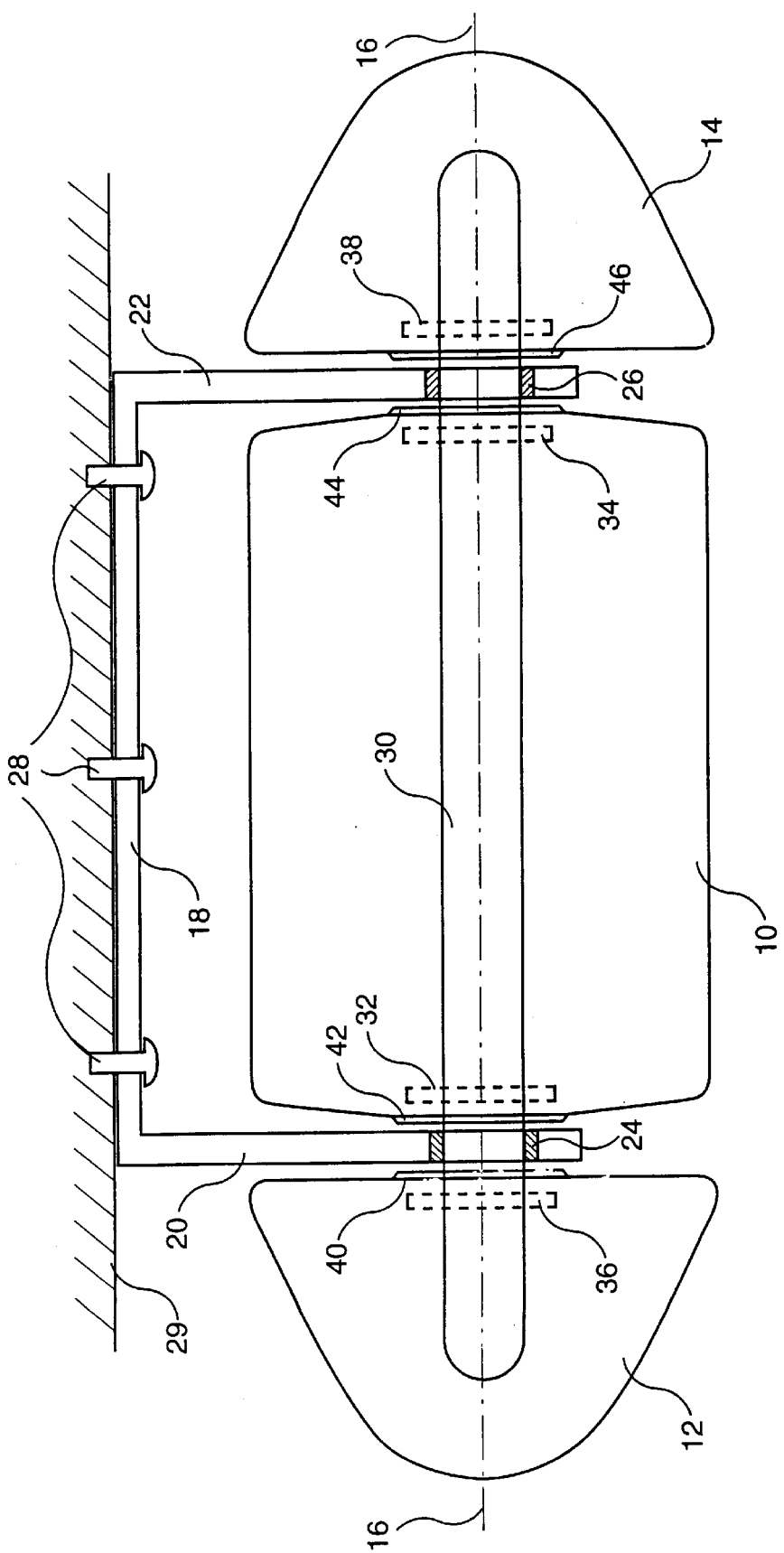
FIG. 1 shows a longitudinal section of a first embodiment of the device according to the present invention, mounted on its support.

The fender device illustrated in FIG. 1 is made up of a cylinder-shaped main protective element 10 and two cone-shaped secondary protective elements 12 and 14. The protecting elements 10, 12 and 14 freely rotate around a geometric axis 16 which is fixed to a support comprising a support plate 18 and two flanges 20 and 22 meant for supporting the fender device. The support plate 18 is fixed by screws 28 to a floating pontoon or to a mooring berth 29.

The two flanges 20 and 22 include two circular roll bearings 24 and 26 in which a high strength metal axle 30 freely rotates around the geometric axis 16.

The main protective element 10 is mounted onto the metal axle 30 and may or may not be integral with the latter. If it must be integral with the metal axle 30, element 10 may be mounted by casting and made integral with the metal axle 30 by means of washers 32 and 34 fixed onto the axle 30 or by any other fixing process, including gluing. But it is also possible to allow element 10 to move freely around axle 30. However, transverse fixings will have to be provided for in order to avoid translation movement in the element in relation to the axle 30. These fixings could be carried out using clips set in grooves provided in the axle 30.

The two elements 12 and 14, like the main element 10, have an axial symmetry around the geometric axis 16, and they have a circular section. They are cone-shaped, that is to say the longitudinal section illustrated in FIG. 1 is a mainly triangularly curvilinear shaped curve, but could also be any other curvilinear form, and especially a semi-circle.

In the same way as the main protective element 10, the two elements 12 and 14 are supported by the metal axle 30 and can be made integral with the latter by washers 36 and 38 mounted on the axle and onto which the elements are cast, or by using any other fixing means, including gluing. If it is desired that the two elements 12 and 14 are not integral with axle 30 but simply rotate around the latter, means have to be allowed for holding the elements in position onto the axle so that they can freely rotate around it, such as clipping means in grooves in the axle.

In the preferred embodiment, the protective elements 10, 12 and 14 are made from elastomeric material such as polyvinyl chloride (PVC), polyethylene, polyurethane or any other equivalent material. In a variant, element 10 and/or elements 12 and 14 may be hollow and filled with air, water or partly filled with an air and an aqueous solution. When filled with air, valves may be incorporated to allow air filling and suitable internal pressure to be maintained.

It should be noted that it is advisable to allow for soft bosses 40 and 46 on the two elements 12 and 14 and 42 and 44 at either end of element 10 in such a way as to strengthen the portions of those elements which are to be subjected to heavy compression.

The device according to the invention can have a length which varies depending on the needs, a length ranging from 20 cm to 2 m being preferred. It may be attached to a mooring berth or to a floating pontoon. Fixing is carried out in such a way that the metal axle is horizontal so that a boat hull coming alongside and subjected to roll movements caused by water turbulence may drive the elements into rotation, and thereby cause a rolling without friction, thus protecting hull against wear.

As mentioned above, a boat is almost never parallel to the mooring berth and carries out small rotary motions. In this case, the hull of the boat moves away from the main element 10 and strikes either of the elements 12 and 14. If the boat is, as mentioned above, additionally subjected to roll due to turbulence in the water or to wind pressure on the hull, contact by the latter causes the rotation of the secondary element 12 or 14. It should be noted that this rotation is not quite a friction-free rolling because of the variation in the rotation radius in element 12 and 14 along the axle, but it will avoid wear to the boat hull which would inevitably occur if the fender device only included a main element and the boat hull were to strike and rub against the metal axle.

It should also be noted that the secondary elements 12 and 14 are almost always engaged and fully justify their existence to the extent to which a boat coming alongside rarely comes parallel to the quayside and inevitably strikes one of the secondary elements 12 or 14.

Figure 2:
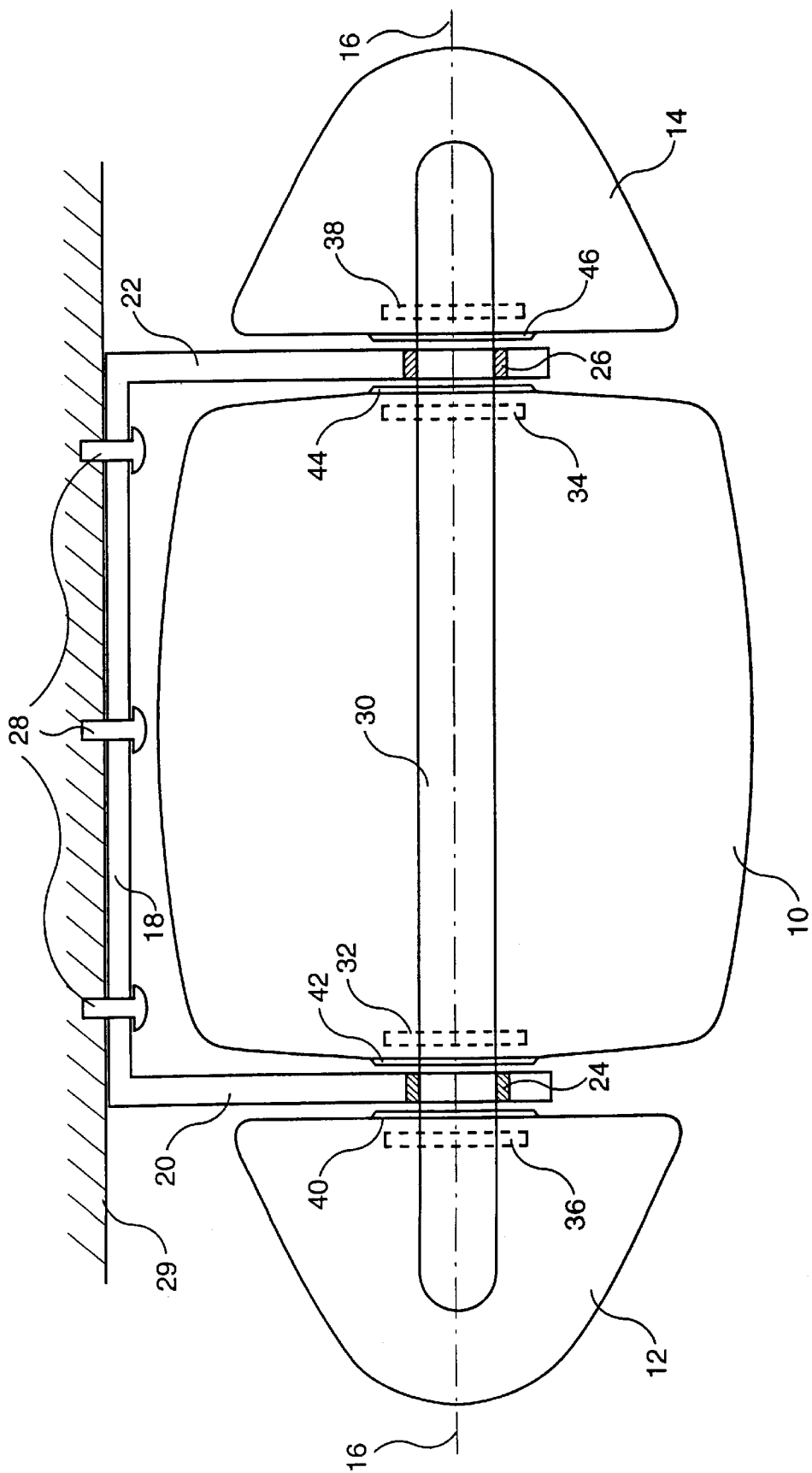
FIG. 2 shows a longitudinal section of a second embodiment of the device according to the present invention, mounted on its support.

A second embodiment that is especially suited to the angular movements of boat hulls in relation to axle 30 is illustrated in FIG. 2. In this embodiment, the main protective element 10 is no longer cylindrical but presents a curvilinear longitudinal section whose profile is approximately an extension of the profile of the longitudinal section of elements 12 and 14. In this way, the main element 10 will be engaged at the same time as one of the elements 12 and 14 each time the boat makes a slight rotary motion. This arrangement therefore allows loading to be shared over two out of the three elements most of the time, that is to say over the main element and one of the two secondary elements instead of a single element.

Even though the fender device according to the invention is mounted with its axis horizontal in the above mentioned embodiments, it is possible to use it with its axis set vertically. This may be the case to ensure protection to hulls of boats that navigate river waters, and especially when the boat is in narrow waters between two quays in a channel or in a lock. The two cone-shaped elements are useful in this case too in protecting the hull of the boat subjected to roll due to water turbulence whilst it moves alongside the quaysides.

Variants of above embodiments may be used without departing from the frame of the invention. In this way, the device could be mounted to a boat hull using a support that is suitable for the hull, rather than fixing it to the quay or pontoon. In addition, the device according to the invention may include several main elements set within the bearings, and especially in the first embodiment where these are cylindrical.

What is claimed is:

1. A fender device for absorbing shocks and preventing wear of a first object in relative movement with respect to a second object (29), comprising a main protective element with axial symmetry and circular cross-section (10) rotating freely about a geometrical axis (16) fixed relative to a support (18, 20, 22) secured to one or the other of the first and second objects and having a hardness index less than that of said first object, said device being characterized in that it further includes in addition two secondary protective cone-shaped elements with axial symmetry and circular cross-section (12, 14) arranged at each end of said main protective element, independent thereof, and also freely rotating about said geometrical axis.

2. The device according to claim 1, wherein said main protective element (10) is cylindrical.

3. The device according to claim 1, wherein said main protective element (10) has a curvilinear longitudinal section whose profile is approximately an extension of the profile of the longitudinal section of the secondary protective elements (12, 14).

4. The device according to claim 1, wherein said main protective element (10) freely rotates around a metal axle (30) secured to said support (18, 20 and 22).

5. The device according to claim 4, wherein said secondary protective elements (12, 14) also freely rotate around said metal axle (30).

6. The device according to claim 1, wherein said main protective element (10) and/or said secondary protective elements (12, 14) are secured to a metal axle freely rotating within bearings (24, 26) secured to said support (18, 20, 22).

7. The device according to claim 1, wherein said main protective elements (10) and secondary protective elements (12, 14) are made of elastomeric material.

8. The device according to claim 1, wherein said main protective element (10) and the secondary protective elements (12, 14) are hollow.

9. The device according to claim 1, wherein said geometric axis (16) is horizontal, said device being used for protecting the hull of a boat moored to a quay or to a pontoon.

10. The device according to claim 9, wherein said support is made up of a support plate (18) fixed to the quay or to the pontoon to which the boat is moored and two flanges (20, 22) for supporting said main protective element (10) and said secondary protective elements (12, 14).

11. The device according to claim 9, fixed to the hull of a boat by means of a suitable supporting means adapted to the hull.

12. The device according to claim 1, wherein said geometric axis (16) is vertical, said device being fixed to the quayside of a river navigation watercourse by means of said support (18, 20, 22) in such a way as to protect a boat hull moving along said watercourse.

* * * * *